(12) United States Patent
Zhang et al.

(10) Patent No.: US 11,941,296 B2
(45) Date of Patent: Mar. 26, 2024

(54) INTELLIGENT STORAGE OF MESSAGES IN PAGE SETS

(71) Applicant: International Business Machines Corporation, Armonk, NY (US)

(72) Inventors: Juan Zhang, Beijing (CN); Anthony John Sharkey, Kinbury (GB)

(73) Assignee: International Business Machines Corporation, Armond, NY (US)

( * ) Notice: Subject to any disclaimer, the term of this patent is extended or adjusted under 35 U.S.C. 154(b) by 112 days.

(21) Appl. No.: 17/646,747

(22) Filed: Jan. 3, 2022

(65) Prior Publication Data
US 2023/0214156 A1    Jul. 6, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0635* (2013.01); *G06F 3/0656* (2013.01); *G06F 3/067* (2013.01)

(58) Field of Classification Search
CPC .... G06F 3/0659; G06F 3/0604; G06F 3/0635; G06F 3/0656; G06F 3/067
See application file for complete search history.

(56) References Cited

U.S. PATENT DOCUMENTS

| | | | |
|---|---|---|---|
| 6,470,427 B1 * | 10/2002 | Arimilli | G06F 12/0862 712/207 |
| 9,235,531 B2 | 1/2016 | Celis et al. | |
| 10,382,574 B2 | 8/2019 | Milyakov | |
| 2012/0324176 A1 | 12/2012 | Bohling et al. | |
| 2013/0151786 A1 | 6/2013 | Huras et al. | |
| 2015/0277802 A1 * | 10/2015 | Oikarinen | G06F 3/0689 711/114 |
| 2015/0365358 A1 | 12/2015 | Strassner | |
| 2019/0043457 A1 * | 2/2019 | Hong | G06F 11/3476 |
| 2019/0332303 A1 | 10/2019 | Watkins | |
| 2021/0365206 A1 * | 11/2021 | Liu | G06F 3/0644 |
| 2023/0018548 A1 * | 1/2023 | Li | G06F 9/45558 |

OTHER PUBLICATIONS

Kreps, "Kafka: a Distributed Messaging System for Log Processing," Computer Science, 2011, 7 pages. http://pages.cs.wisc.edu/~akella/CS744/F17/838-CloudPapers/Kafka.pdf.
PCT International Search Report and Written Opinion, dated Mar. 3, 2023, regarding Application No. PCT/EP2022/084819, 11 pages.

* cited by examiner

*Primary Examiner* — Michelle T Bechtold
(74) *Attorney, Agent, or Firm* — Yee & Associates, P.C.

(57) ABSTRACT

Intelligent storage of messages is provided. A spill-over page set is selected to store received messages corresponding to a predefined target page set associated with an application workload in response to the predefined target page set reaching a predefined minimum unused page threshold level. The spill-over page set is utilized as a message storage destination for the received messages corresponding to the predefined target page set associated with the application workload to extend message storage for the predefined target page set after the predefined target page set reached the predefined minimum unused page threshold level.

17 Claims, 7 Drawing Sheets

| PAGE SET ID 502 | BUFFER POOL ID 504 | FREQUENCY OF CLOSE TO FULL 506 | RECENTLY CLOSE TO FULL BIT SET? 508 | TOTAL PAGES 510 | UNUSED PAGES 512 | POINTER TO NEXT SCALE-OUT PAGE SET 514 | ASSIGNED STORAGE CLASSES 516 |
|---|---|---|---|---|---|---|---|
| 0 | 0 | 0 | N | 50K | 20K | x'0000 FFFFF' | A0, A1, A2... |
| 1 | 1 | 0 | N | 60K | 18K | x'0001 FFFF' | B0, B1, B2... |
| 2 | 2 | 5 | N | 80K | 8K | ... | C0, C1, C2... |
| 3 | 3 | 1 | Y | 70K | 3K | ... | D0, D1, D2... |
| 4 | 1 | 4 | Y | 60K | 20K | ... | E0, E1, E2... |
| 6 | 2 | 1 | N | 60K | 20K | ... | F0, F1, F2... |
| 7 | 3 | 1 | Y | 70K | 20K | ... | G0, G1, G2... |

PAGE SET LIST 500

INTELLIGENT STORAGE OF MESSAGES IN PAGE SETS

BACKGROUND

1. Field

The disclosure relates generally to page sets and more specifically to intelligent storage of messages in spill-over page sets having available unused pages in response to the number of unused pages of the original predefined target page sets for the messages reaching a predefined minimum unused page threshold level.

2. Description of the Related Art

A page set is used to store messages physically, such as a data set on a direct access storage device (DASD), such as, for example, a disk drive. A page set is a specially-formatted virtual storage access method for DASD data set. Each page set is identified by a page set identifier. Architectural limitations exist on a page set. For example, a page set data storage limit may be 64 gigabytes. Each page set is associated with a buffer pool.

Some current message engines have messages stored in page sets on disk. These current message engines can extend space to store messages, but input/output (I/O) cost to retrieve those messages is expensive. Other current message engines exist that can cache hot pages (e.g., often requested pages in a short amount of time) in memory and messages are consumed without performing any I/O operations. These other current message engines store messages in multi-level message storage according to storage performance and costs. For example, short-lived messages (e.g., messages that are retrieved from a queue shortly after the messages are received) may be stored in buffers only. In contrast, long-lived messages are stored in formatted message storage as page sets. However, an issue exists for these current message engines in filling specific page sets.

SUMMARY

According to one illustrative embodiment, a computer-implemented method for intelligent storage of messages is provided. A computer selects a spill-over page set to store received messages corresponding to a predefined target page set associated with an application workload in response to the predefined target page set reaching a predefined minimum unused page threshold level. The computer utilizes the spill-over page set as a message storage destination for the received messages corresponding to the predefined target page set associated with the application workload to extend message storage for the predefined target page set after the predefined target page set reached the predefined minimum unused page threshold level. According to other illustrative embodiments, a computer system and computer program product for intelligent storage of messages are provided. As a result, the illustrative embodiments can automatically extend message storage to spill-over page sets that have available unused pages to keep application workloads running when predefined target page sets corresponding to the application workloads reach the defined minimum unused page threshold level. Thus, illustrative embodiments by extending the message storage capacity of page sets provide a scale-out page set process that protects buffers so that queues receiving a sudden arrival of many messages do not negatively impact performance of priority queues.

The illustrative embodiments also optionally determine whether a scale-out bit is set for the predefined target page set. As a result, the illustrative embodiments by setting the scale-out bit of page sets are capable of keeping application workloads running without outages caused by lack of message storage on predefined target page sets.

DETAILED DESCRIPTION

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
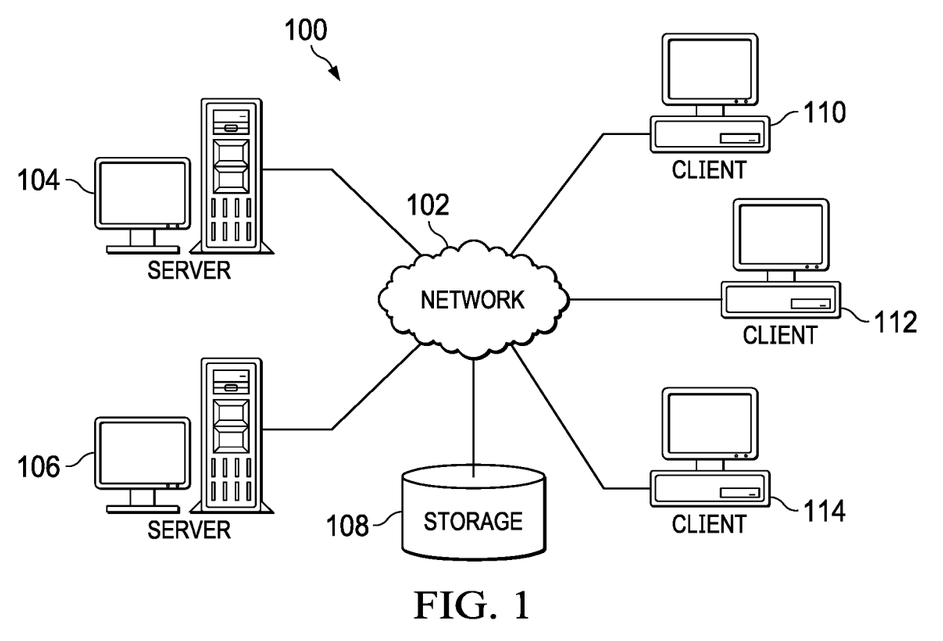
FIG. 1 is a pictorial representation of a network of data processing systems in which illustrative embodiments may be implemented.
Figure 2:
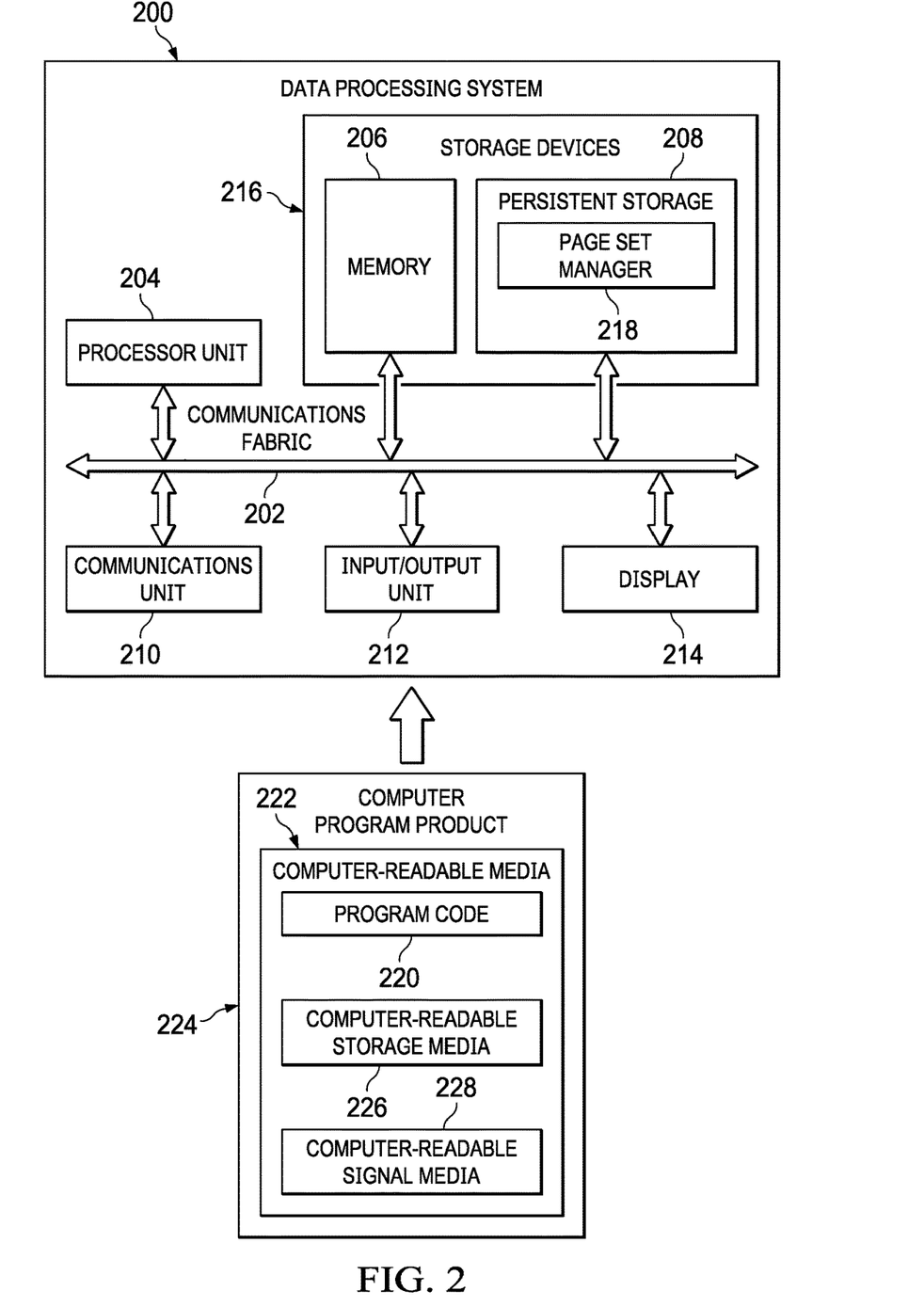
FIG. 2 is a diagram of a data processing system in which illustrative embodiments may be implemented.
Figure 3:
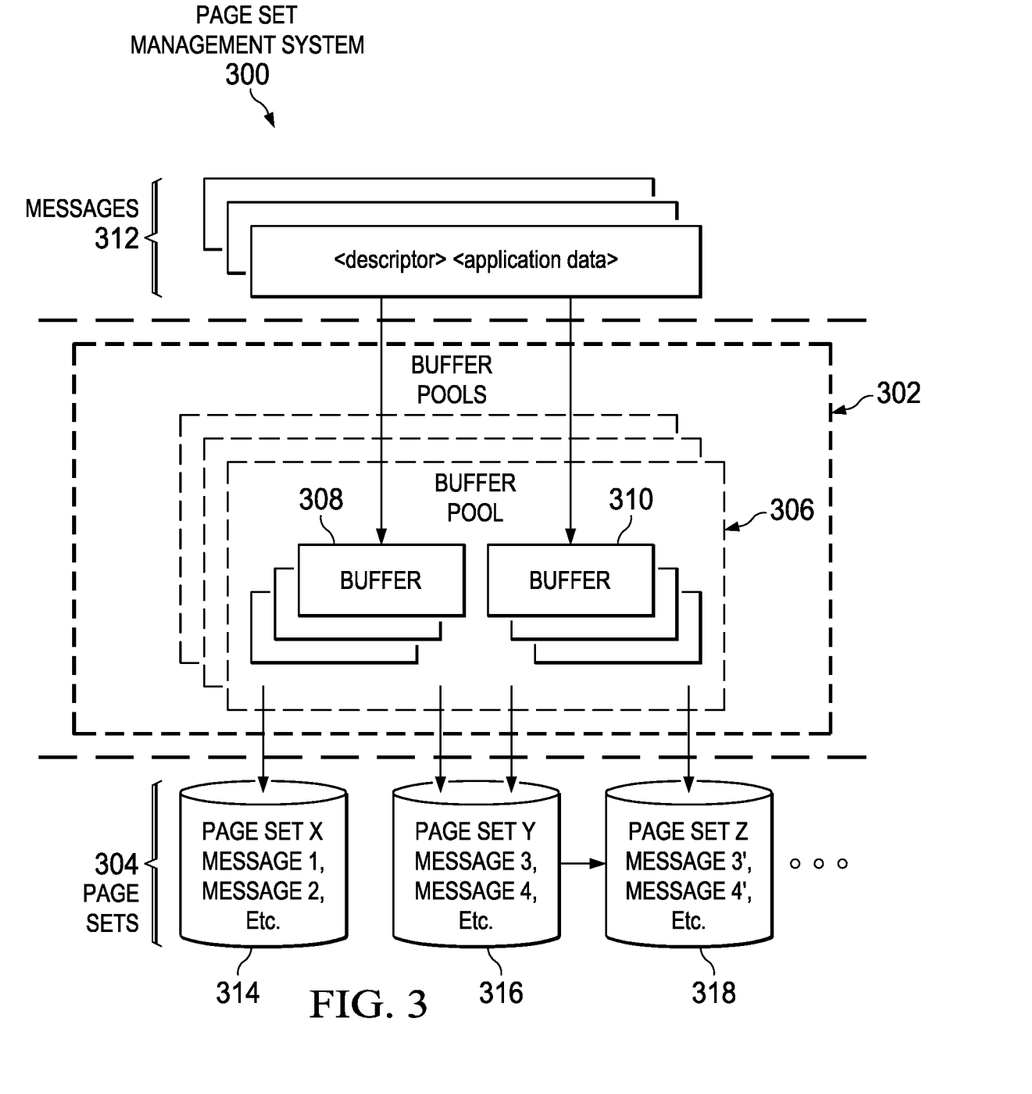
FIG. 3 is a diagram illustrating an example of a page set management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 provide a set of services, such as, for example, event monitoring services, transaction services, financial services, banking services, governmental services, educational services, reservation services, data services, or the like, to client device users. Further, server 104 and server 106 perform intelligent storage of messages, which correspond to application workloads of the services provided by server 104 and server 106, across page sets managed by server 104 and server 106. For example, server 104 and server 106 store messages in spill-over page sets having available unused pages in response to the number of unused pages of predefined target page sets for the messages corresponding to the application workloads reaching a predefined minimum unused page threshold level. The predefined minimum unused page threshold level may be, for example, 500, 1000, 1500, 2000, 2500, or the like unused pages in a page set.

Client 110, client 112, and client 114 also connect to network 102. Clients 110, 112, and 114 are client devices of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart vehicles, smart appliances, gaming devices, kiosks, and the like, with wire or wireless communication links to network 102. Users of clients 110, 112, and 114 may utilize clients 110, 112, and 114 to access and utilize the set of services provided by server 104 and server 106. Clients 110, 112, and 114 send messages corresponding to applications of the set of services to server 104 and server 106.

Server 104 and server 106 store the messages corresponding to the applications of the set of services in page sets located on server 104 and server 106 and/or on storage 108. Storage 108 is a network storage device capable of storing any type of data in a structured format or an unstructured format. In addition, storage 108 may represent a plurality of network storage devices. Further, storage 108 may store a plurality of different page sets corresponding to different application workloads associated with different services, identifiers for each respective page set, page set lists, and the like. Furthermore, storage 108 may store other types of data, such as authentication or credential data that may include usernames, passwords, and the like associated with system administrators and client device users, for example.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the intelligent message storage processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores page set manager 218. However, it should be noted that even though page set manager 218 is illustrated as residing in persistent storage 208, in an alternative illustrative embodiment page set manager 218 may be a separate component of data processing system 200. For example, page set manager 218 may be a hardware component coupled to communication fabric 202 or a combination of hardware and software components. In another alternative illustrative embodiment, a first set of components of page set manager 218 may be located in data processing system 200 and a second set of components of page set manager 218 may be located in a second data processing system, such as, for example, server 106 in FIG. 1.

Page set manager 218 controls the process of intelligently storing messages corresponding to application workloads of services, which are provided by data processing system 200, across page sets. Page set manager 218 monitors a status of each respective page set to detect when the number of unused pages of a predefined target page set for messages corresponding to an application workload reaches the predefined minimum unused page threshold level. In response to detecting that the number of unused pages of a particular predefined target page set has reached the predefined minimum unused page threshold level based on the monitoring, page set manager 218 selects the first spill-over page set listed in a list of available spill-over page sets as a storage destination for messages corresponding to that particular predefined target page set, which has reached the predefined minimum unused page threshold level. Afterward, page set manager 218 stores the messages, which correspond to that particular predefined target page set, in the selected spill-over page set that has available unused pages to store the messages.

As a result, data processing system 200 operates as a special purpose computer system in which page set manager 218 in data processing system 200 enables intelligent storage of messages in page sets. In particular, page set manager 218 transforms data processing system 200 into a special purpose computer system as compared to currently available general computer systems that do not have page set manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Currently, page sets have additional capacity for "scale-out," but that is not as intelligent as using existing free space (e.g., unused pages) in page sets. Current queue managers can perform message caching using buffers and write updated pages from buffers to other message storage, such as, for example, page sets, disk, or tape. These current queue managers benefit from buffers, which are fast to put messages in or get messages from, but also benefit from page sets, which allow greater storage capacity. However, illustrative embodiments extend the storage capacity of page sets by providing a scale-out page set process, while protecting existing buffers so that queues receiving a sudden arrival of many messages do not negatively impact performance of "important" or "priority" queues, such as system queues or high priority application queues. A bottleneck may be a message getter is far away from a message putter or the message getter fails while the message putter does not.

Illustrative embodiments continue to store messages as predefined target page sets corresponding to application workloads become full, preventing the applications from crashing. Illustrative embodiments integrate high performance message storage and can intelligently scale-out messages across multi-level message storage. Illustrative embodiments utilize a page set manager to detect when page sets reach the predefined minimum unused page threshold level, maintain a list of page sets that have available unused pages from which the page set manager can select a particular page set to continue to store messages for a full or nearly full page set, and assign an extended storage class corresponding to the selected page set to a queue. Each page set has a bit that the page set manager can set to indicate whether that particular page set can be used as a message storage destination for other page sets, which have reached the predefined minimum unused page threshold level, to scale-out (e.g., spill-over) to.

Illustrative embodiments also utilize a multi-dwelling queue as a logical unit of message storage. Each queue in the multi-dwelling queue has its own predefined storage class and extended storage class (e.g., multi-dimensional storage class), which illustrative embodiments automatically update when that particular queue's destination message storage reaches the predefined maximum message storage threshold level. Each storage class maps to one page set, which stores the messages. In other words, a queue references a storage class, a storage class references a page set, and a page set stores the messages.

Each queue has a bit that the page set manager of illustrative embodiments can set to indicate whether that particular queue is allowed to scale-out onto other page sets. The page set manager utilizes a spill-over page set to take advantage of available storage space (e.g., unused pages of the spill-over page set). Each spill-over page set contains an index of message locations, which include an identifier of that spill-over page set, to read or get messages back into a buffer when the messages, which correspond to a full page set, are stored across a plurality of spill-over page sets. The page set manager utilizes the indices to locate and read a particular message back into a buffer when the message could be stored in one of many spill-over page sets.

It should be noted that illustrative embodiments can keep buffer pool allocation or selection under the control of a user to ensure that higher priority queues requiring optimal response times are isolated from queues where capacity is important when reuse of buffer pool space is not wanted.

Further, illustrative embodiments can utilize "real storage" when needed. For example, when going into buffer scale-out mode, the page set manager of illustrative embodiments can query an operating system to determine how much unused real storage is available and dynamically allocate an amount of that unused real storage, while maintaining some predefined percentage of unused real storage, for scale-out buffers. Illustrative embodiments can then release that allocated amount of real storage when the real storage is no longer needed. As a result, illustrative embodiments enable increased performance from buffer pools, without affecting existing buffer pool usage and multi-level message storage, along with not breaking applications by stealing their real storage, which can cause paging.

The page set manager of illustrative embodiments can dynamically extent out to spill-over page sets according to historical peak workloads of service applications and then resume to original target page sets for queues when peak workload periods end. Each application workload has a defined page set limit. The page set manager sets the scale-out bit of page sets that are allowed to extend message storage out to spill-over page sets. Thus, illustrative embodiments by setting the scale-out bit on page sets are capable of keeping application workloads running without outages caused by lack of message storage on original predefined target page sets.

As a result, even though the number of page sets and buffer pools are predefined, illustrative embodiments can automatically extend message storage to spill-over page sets that have available unused pages to keep application workloads running when original predefined target page sets corresponding to the application workloads reach the defined minimum unused page threshold level. Afterward, illustrative embodiments can automatically revert back to the original target page sets corresponding to the application workloads when extended message storage on the spill-over page sets is no longer needed (e.g., after a peak workload period has ended, the number of unused pages in the original predefined target page set is greater than the predefined unused page threshold level by a defined percentage amount, or the like). Thus, illustrative embodiments achieve scaling across multiple levels of message storage (e.g., buffer pools for performance and page sets for capacity) and balance storage efficiency with storage space.

Thus, illustrative embodiments provide one or more technical solutions that overcome a technical problem with utilizing storage space in page sets intelligently and efficiently to prevent application workload crashes. As a result, these one or more technical solutions provide a technical effect and practical application in the field of data storage.

With reference now to FIG. 3, a diagram illustrating an example of a page set management system is depicted in accordance with an illustrative embodiment. Page set management system 300 may be implemented in a network of data processing systems, such as network data processing system 100 in FIG. 1. Page set management system 300 is a system of hardware and software components for the intelligent storage of messages corresponding to application workloads in page sets.

In this example, page set management system 300 includes buffer pools 302 and page sets 304. Buffer pools 302 and page sets 304 may be implemented in a computer, such as, for example, server 104 in FIG. 1 or data processing system 200 in FIG. 2. Buffer pools 302 may be implemented in, for example, memory, such as memory 206 in FIG. 2. Page sets 304 may be implemented in, for example, persistent storage, such as persistent storage 208 in FIG. 2.

Buffer pools 302 include a plurality of individual buffer pools, such as buffer pool 306. Buffer pool 306 stores messages 312 temporarily in buffers, such as buffer 308 or buffer 310, before messages 312 are stored in page sets 304. Messages 312 are received from client devices, such as, for example, clients 110, 112, and 114 of FIG. 1, via a network, such as, for example, network 102 in FIG. 1. Messages 312 correspond to a set of application workloads associated with a set of services provided by the computer. A message may include, for example, a message descriptor, application data, and the like, which correspond to a particular application workload of a given service. Each application workload has a predefined target page set as a message storage destination.

Buffer 308 and buffer 310 may be, for example, a 4 kilobyte buffer. Each buffer pool of buffer pools 302 is associated with (e.g., maps to) a particular page set, such as page set X 314, page set Y 316, or page set Z 318, of page sets 304. Alternatively, a set of buffer pools can be mapped to a single page set.

A page set manager, such as, for example, page set manager 218 in FIG. 2, utilizes a spill-over page set (e.g., page set Z 318) as a message storage destination for messages originally mapped to the predefined target page set (e.g., page set Y 316) to scale-out to when the original predefined target page set reaches or falls below the predefined minimum unused page threshold level and has its scale-out bit set. A page set scale-out bit, when set, indicates that that particular page set is allowed to scale-out or extend-out message storage to a spill-over page set that has available unused pages.

The page set manager of illustrative embodiments can utilize an addressing rule, such as, for example, pageset.page.record, for page sets 304. Currently, for a single queue, the page set portion of the addressing rule remains the same. However, the page set manager can make the page set portion of the addressing rule different for messages on a single queue or for a single message when there is not sufficient storage space in the original predefined target page set corresponding to a particular application workload. The page set manager automatically updates the page set portion of the "pageset.page.record" addressing rule as needed (e.g., as the original predefined target page set reaches the predefined minimum unused page threshold level).

Thus, illustrative embodiments ensure that a sudden arrival of a multitude of messages do not negatively impact performance of important or high priority queues, such as, for example, system queues or high priority application queues. Illustrative embodiments do not reuse buffer pool space because illustrative embodiments keep buffer pool allocation or selection under the control of a user to ensure that high priority queues needing shortest possible response times are isolated from queues where capacity is needed.

Figure 4:
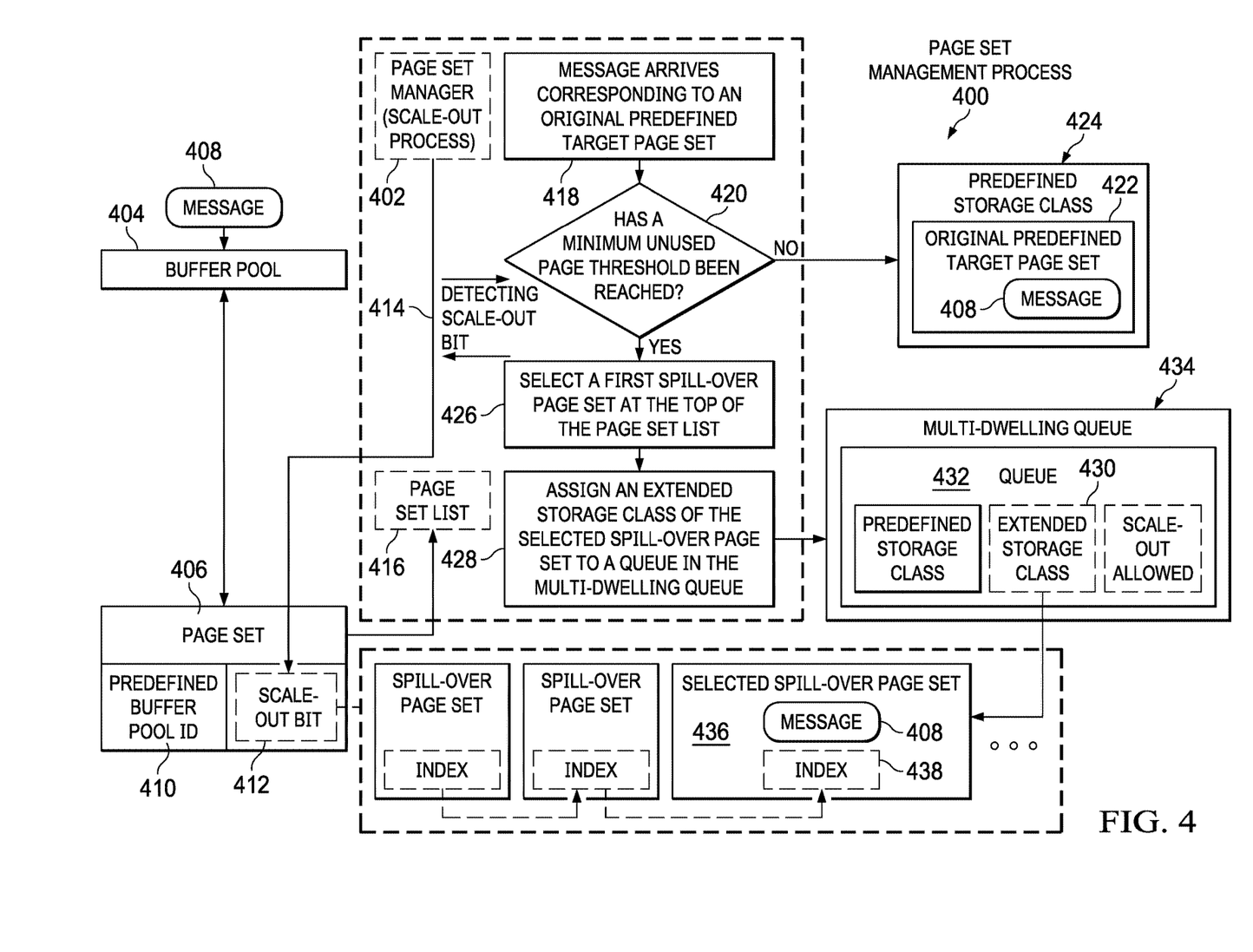
FIG. 4 is a diagram illustrating an example of a page set management process in accordance with an illustrative embodiment.

With reference now to FIG. 4, a diagram illustrating an example of a page set management process is depicted in accordance with an illustrative embodiment. Page set management process 400 may be implemented in a computer, such as, for example, server 104 in FIG. 1 or data processing system 200 in FIG. 2.

In this example, page set management process 400 includes page set manager 402, buffer pool 404, and page set 406. Page set manager 402 may be, for example, page set manager 218 in FIG. 2. Buffer pool 404 and page set 406 may be, for example, buffer pool 306 and page set X 314 in FIG. 3. However, it should be noted that page set management process 400 is intended as an example only and not as a limitation on illustrative embodiments. In other words, page set management process 400 may include any number of page set managers, buffer pools, page sets, and other components.

The computer receives message 408 from a client device, such as, for example, client 110 in FIG. 1. The computer places message temporarily in buffer pool 404 prior to loading message 408 in page set 406. Page set 406 includes predefined buffer pool identifier 410 and scale-out bit 412. Predefined buffer pool identifier 410 represents the unique identifier corresponding to buffer pool 404. In other words, buffer pool 404 is the predefined buffer pool for page set 406. Page set 406 is the original predefined target page set for message 408. Scale-out bit 412 indicates whether page set 406 is allowed to scale-out to a spill-over page set in the event that the number of unused pages of page set 406 reaches the predefined minimum unused page threshold level.

At 414, page set manager 402 performs a scale-out process to detect whether scale-out bit 412 is set in page set 406 in response to the number of unused pages of page set 406 reaching the predefined minimum unused page threshold level. If page set manager 402 detects that scale-out bit 412 is set in page set 406, then page set manager 402 searches page set list 416 for a spill-over page set having unused pages as a scale-out message storage destination for page set 406.

For example, at 418, message 408 arrives corresponding to an original target predefined target page set. At 420, page set manager 402 makes a determination as to whether the predefined minimum unused page threshold level has been reached for the original predefined target page set. If page set manager 402 determines that the predefined minimum unused page threshold level has not been reached for the original predefined target page set, then page set manager 402 stores message 408 in original predefined target page set 422 (e.g., page set 406) via predefined storage class 424. If page set manager 402 determines that the minimum unused page threshold level has been reached for the original predefined target page set, then, at 426, page set manager 402 selects the first spill-over page set at the top of page set list 416. In addition, at 428, page set manager 402 assigns extended storage class 430 of the selected spill-over page set to queue 432 in multi-dwelling queue 434.

A queue is a logical unit of message storage. Page set manager 402 opens the queue and places a message in the queue. Page set manager 402 knows which queue to place the message. Queues are mapped to page sets via storage classes. In other words, storage classes control which page sets are used by which queues. A storage class maps one or more queues to a page set. This means that messages for that queue are stored on that page set. Storage classes allow a user to control where messages are stored for application workload management.

In this example, queue 432 is allowed to scale-out to other page sets because the scale-out bit of queue 432 is set. As a result, page set manager 402 stores message 408 in selected spill-over page set 436 via extended storage class 430. Selected spill-over page set 436 includes index 438. Index 438 is an index of message locations, which includes, for example, identifiers of page sets. Page set manager 402 utilizes index 438 to read messages back into buffers when messages corresponding to full or nearly full page set 406 are stored across a plurality of spill-over page sets.

Figure 5:
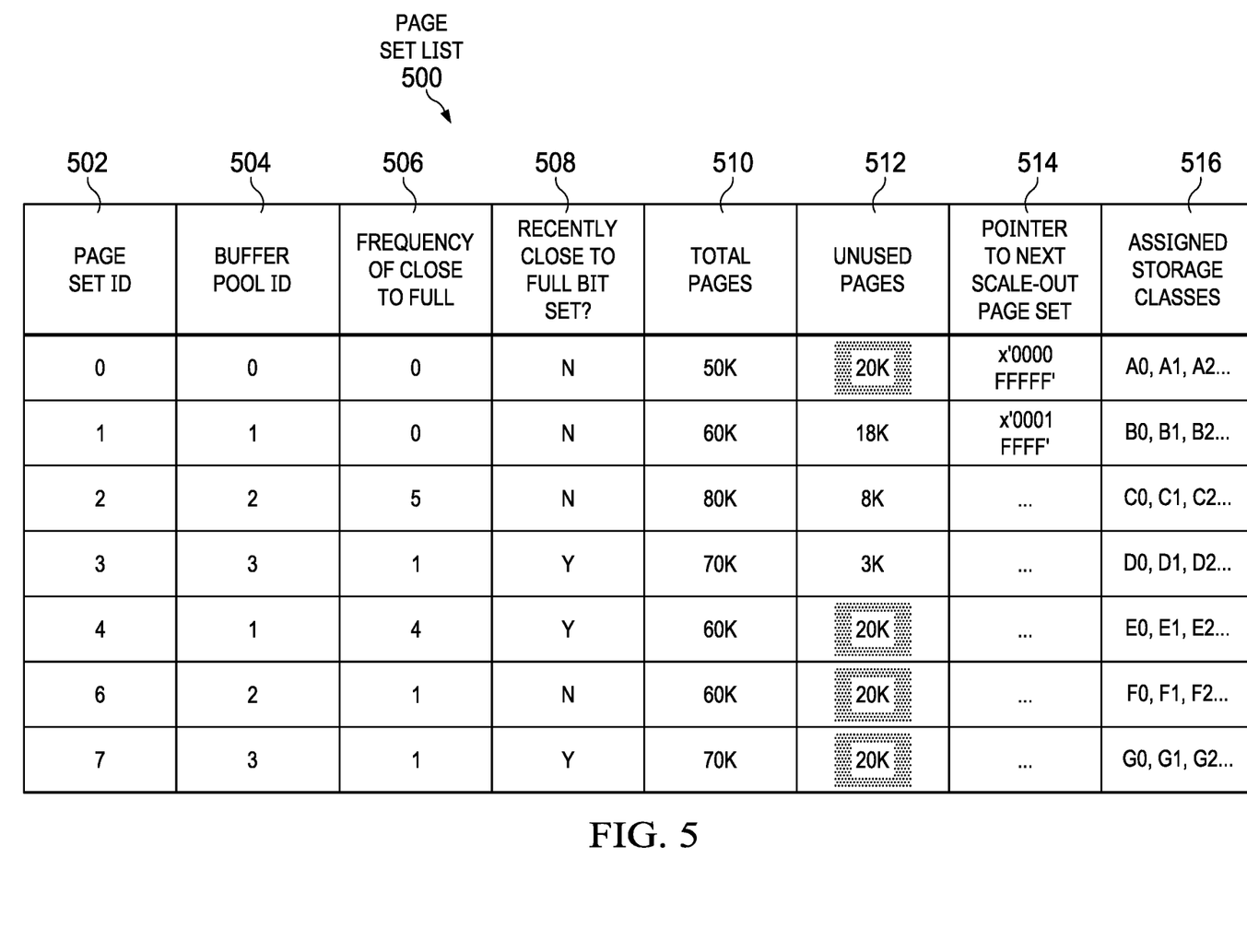
FIG. 5 is a diagram illustrating an example of a page set list in accordance with an illustrative embodiment.

With reference now to FIG. 5, a diagram illustrating an example of a page set list is depicted in accordance with an illustrative embodiment. Page set list 500 may be implemented by a page set manager, such as, for example, page set manager 402 in FIG. 4. Page set list 500 may be, for example, page set list 416 in FIG. 4.

In this example, page set list 500 includes columns for page set identifier (ID) 502, buffer pool ID 504, frequency of close to full 506, recently close to full bit set 508, total pages 510, unused pages 512, pointer to next scale-out page set 514, and assigned storage classes 516. The column for page set ID 502 provides a unique identifier for each respective page set managed by the page set manager. The column for buffer pool ID 504 provides a unique identifier of the predefined buffer pool for each corresponding page set. The column for frequency of close to full 506 provides an indication of how many times a particular page set was close to being full (e.g., reached the predefined minimum unused page threshold level). The column for recently close to full bit set 508 indicates whether, Yes (Y) or No (N), a bit was set indicating that a particular page set was recently close to being full. The column for total pages 510 indicates the total number of pages for each respective page set. The column for unused pages 512 indicates the number of unused pages for each respective page set. The column for pointer to next scale-out page set 514 provides a pointer to the next spill-over page set for each respective page set. The column for assigned storage classes 516 indicates which storage classes are assigned to each respective page set.

When the number of unused pages of a particular page set reaches the defined minimum number of unused pages threshold level, the page set manager searches page set list 500 to identify another page set (e.g., a spill-over page set) as a storage destination for messages corresponding to the original predefined target page set that has reached the threshold level. It should be noted that each page set includes a bit that the page set manager can set to indicate whether that particular page set can be used as a message storage destination for other page sets to scale-out to so that queues that receive a sudden influx of a large number of messages do not negatively impact performance of high priority queues, such as, for example, system queues or high priority application queues. In other words, the page set manager protects performance of these high priority queues. Further, each respective queue includes a bit that the page set manager can set to indicate whether that particular queue is allowed to scale-out onto other page sets. In other words, the bit ensures that the high priority queues needing optimal response times are isolated from queues where capacity is more important. Further, each respective spill-over page set contains an index of message locations, which includes page set identifiers, to get or read messages back into buffers when these messages, which correspond to a full original predefined target page set, are stored across a plurality of spill-over page sets. The index links messages of one queue, which are stored in different page sets of that queue, so that the messages can be loaded back to buffers efficiently.

The page set manager selects the page set listed at the top of page set list 500 (e.g., the page set with page set ID 0 listed first in page set list 500) as the storage destination for the messages corresponding to the original predefined target page set that reached the predefined minimum unused page threshold level. In addition, the page set manager assigns an extended storage class, which corresponds to the selected page set, to a particular queue in a multi-dwelling queue. Messages sent to that particular queue, after the original predefined target page set reached the threshold level, will be stored in the newly selected page set in the queue via the extended storage class corresponding to that selected page set. The page set manager continuously, or on a defined time interval basis, checks the unused page status of each respective page set. In addition, the page set manager not only knows the current real time usage of each respective page set, but also understands historical usage of each respective page set per application workload for faster spill-over when needed.

The page set manager maintains page set list 500 using a set of rules. For example, page set list 500 only contains page sets available for spill-over (e.g., those page sets having the scale-out bit set). The page set manager sorts page sets by number of unused pages. For example, the page set manager places an identifier of page set with the greatest number of unused pages at the top of page set list 500. Further, the page set manager moves an identifier of a page set to the bottom of page set list 500 when that particular page set reaches the predefined minimum unused page threshold level. In addition, the page set manager marks that particular page set moved to the bottom of the list as "Y" in the column for recently close to full bit set 508 and also increments the column for frequency of close to full 506 by 1 for that particular page set each time that particular page set is moved to the bottom of page set list 500. The page set manager also selects a page set having the lowest number in the column for frequency close to full 506 when the number of unused pages is the same for each candidate spill-over page set. Furthermore, the page set manager can determine which page set to utilize by combining the real time data in page set list 500 and the historical usage data corresponding to the page sets.

Figure 6:
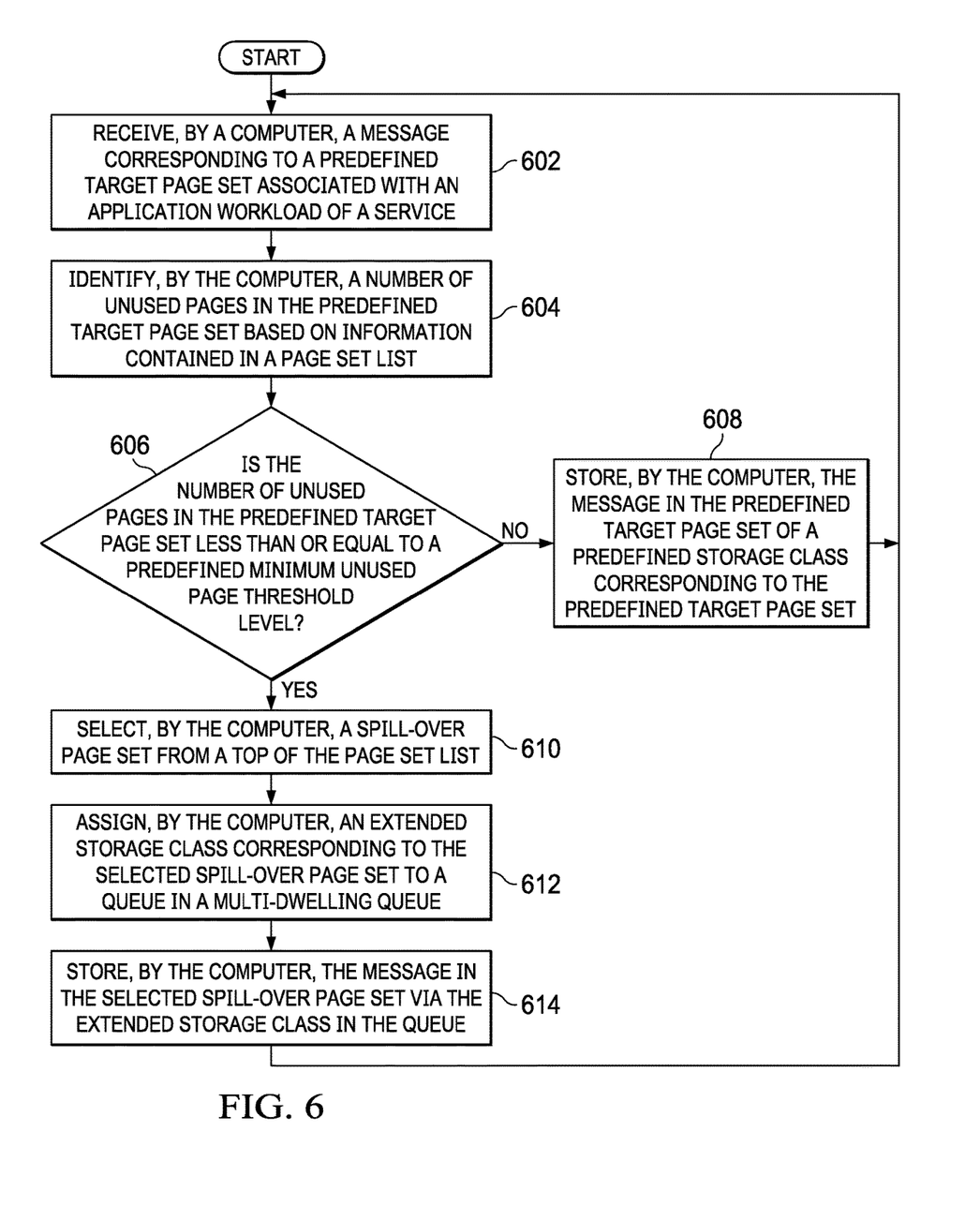
FIG. 6 is a flowchart illustrating a process for extending page set storage of messages in accordance with an illustrative embodiment.

With reference now to FIG. 6, a flowchart illustrating a process for extending page set storage of messages is shown in accordance with an illustrative embodiment. The process shown in FIG. 6 may be implemented in a computer, such as, for example, server 104 in FIG. 1 or data processing system 200 in FIG. 2. For example, the process shown in FIG. 6 may be implemented in page set manager 218 in FIG. 2.

The process begins when the computer receives a message corresponding to a predefined target page set associated with an application workload of a service (step 602). In response to receiving the message, the computer identifies a number of unused pages in the predefined target page set based on information contained in a page set list (step 604).

Afterward, the computer makes a determination as to whether the number of unused pages in the predefined target page set is less than or equal to a predefined minimum unused page threshold level (step 606). If the computer determines that the number of unused pages in the predefined target page set is not less than or equal to the predefined minimum unused page threshold level, no output of step 606, then the computer stores the message in the predefined target page set of a predefined storage class corresponding to the predefined target page set (step 608). Thereafter, the process returns to step 602 where the computer waits to receive another message.

Returning again to step 606, if the computer determines that the number of unused pages in the predefined target page set is less than or equal to the predefined minimum unused page threshold level, yes output of step 606, then the computer selects a spill-over page set from a top of the page set list (step 610). In addition, the computer assigns an extended storage class corresponding to the selected spill-over page set to a queue in a multi-dwelling queue (step 612). Further, the computer stores the message in the selected spill-over page set via the extended storage class in the queue (step 614). Thereafter, the process returns to step 602 where the computer waits to receive another message.

Figure 7:
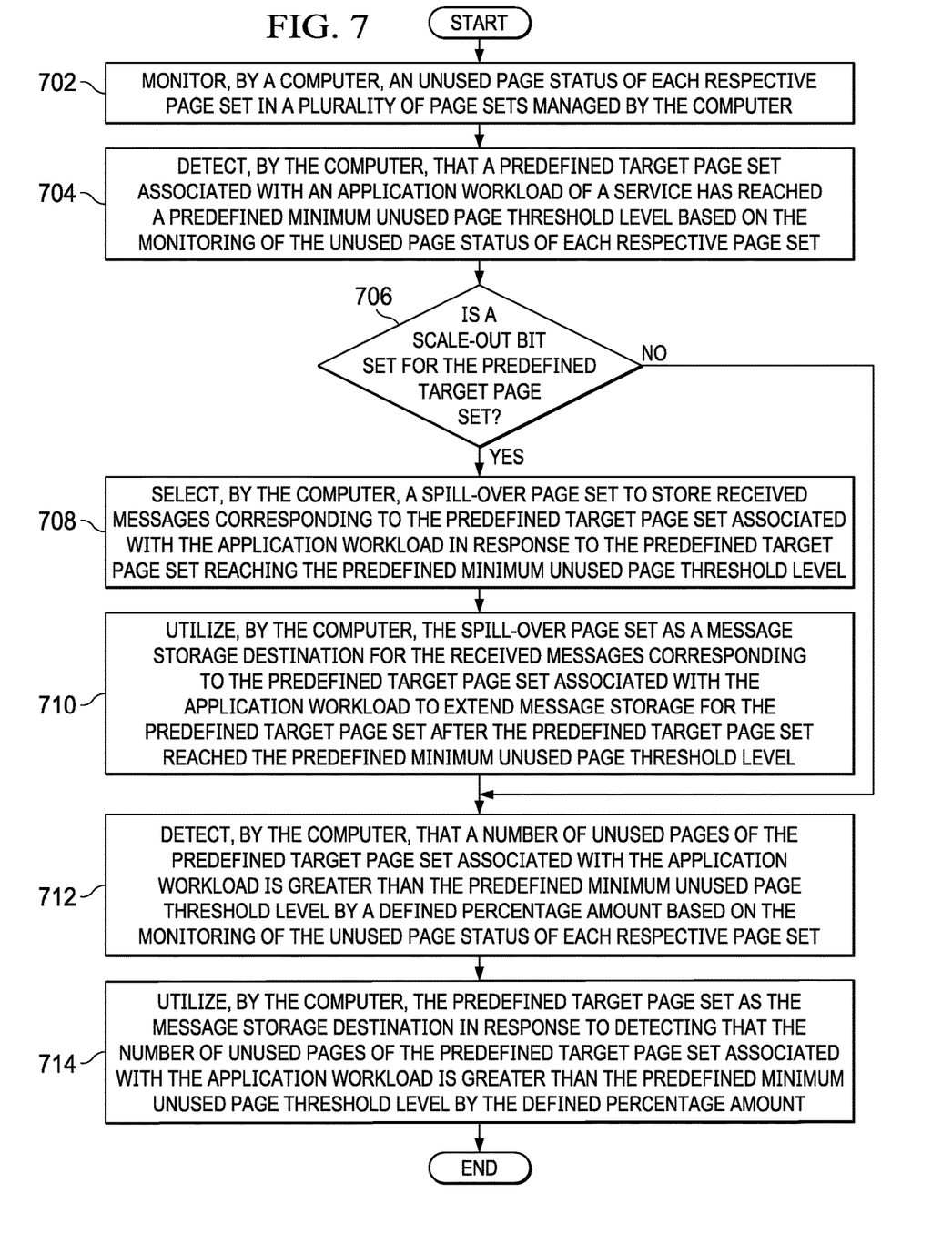
FIG. 7 is a flowchart illustrating a process for intelligent storage of messages in page sets in accordance with an illustrative embodiment.

With reference now to FIG. 7, a flowchart illustrating a process for intelligent storage of messages in page sets is shown in accordance with an illustrative embodiment. The process shown in FIG. 7 may be implemented in a computer, such as, for example, server 104 in FIG. 1 or data processing system 200 in FIG. 2. For example, the process shown in FIG. 7 may be implemented in page set manager 218 in FIG. 2.

The process begins when the computer monitors an unused page status of each respective page set in a plurality of page sets managed by the computer (step 702). The computer can perform the monitoring of the unused page status of each respective page set on, for example, a continuous basis, a predetermined time interval basis, or on demand. The computer detects that a predefined target page set associated with an application workload of a service has reached a predefined minimum unused page threshold level based on the monitoring of the unused page status of each respective page set (step 704).

In response to detecting that the predefined target page set associated with the application workload has reached the predefined minimum unused page threshold level, the computer makes a determination as to whether a scale-out bit is set for the predefined target page set (step 706). If the computer determines that the scale-out bit is not set for the predefined target page set, no output of step 706, then the process proceeds to step 712. If the computer determines that the scale-out bit is set for the predefined target page set, yes output of step 706, then the computer selects a spill-over page set to store received messages corresponding to the predefined target page set associated with the application workload in response to the predefined target page set reaching the predefined minimum unused page threshold level (step 708).

Further, the computer utilizes the spill-over page set as a message storage destination for the received messages corresponding to the predefined target page set associated with the application workload to extend message storage for the predefined target page set after the predefined target page set reached the predefined minimum unused page threshold level (step 710). Afterward, the computer detects that a number of unused pages of the predefined target page set associated with the application workload is greater than the predefined minimum unused page threshold level by a defined percentage amount based on the monitoring of the unused page status of each respective page set (step 712). The defined percentage amount may be, for example, 5%, 10%, 15%, 20%, 25%, or the like of the total number of pages of the predefined target page set. Subsequently, the computer utilizes the predefined target page set as the message storage destination in response to detecting that the number of unused pages of the predefined target page set associated with the application workload is greater than the predefined minimum unused page threshold level by the defined percentage amount (step 714). Thereafter, the process returns to step 702 where the computer continues to monitor the unused page status of each respective page set.

Thus, illustrative embodiments of the present invention provide a computer-implemented method, computer system, and computer program product for intelligent storage of messages in spill-over page sets having available unused pages as the number of unused pages of the original predefined target page sets for the messages reach a predefined minimum unused page threshold level. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for intelligent storage of messages, the computer-implemented method comprising:
    selecting, by a computer, a spill-over page set in persistent storage to store messages received from buffer pools, wherein the received messages are corresponding to a predefined target page set associated with an application workload in response to the predefined target page set reaching a predefined minimum unused page threshold level;
    utilizing, by the computer, the spill-over page set as a message storage destination for the received messages corresponding to the predefined target page set associated with the application workload to extend message storage for the predefined target page set after the predefined target page set reached the predefined minimum unused page threshold level;
    detecting, by the computer, a number of unused pages of the predefined target page set associated with the application workload is greater than the predefined minimum unused page threshold level by a defined percentage amount; and
    utilizing, by the computer, the predefined target page set as the message storage destination in response to detecting that the number of unused pages of the predefined target page set associated with the application workload is greater than the predefined minimum unused page threshold level by the defined percentage amount.

2. The computer-implemented method of claim 1 further comprising:
    monitoring, by the computer, an unused page status of each respective page set in a plurality of page sets; and
    detecting, by the computer, that the predefined target page set associated with the application workload has reached the predefined minimum unused page threshold level based on the monitoring of the unused page status of each respective page set.

3. The computer-implemented method of claim 1 further comprising:
    determining, by the computer, whether a scale-out bit is set for the predefined target page set.

4. The computer-implemented method of claim 1 further comprising:
    receiving, by the computer, a message corresponding to the predefined target page set associated with the application workload of a service; and
    identifying, by the computer, a number of unused pages in the predefined target page set based on information contained in a page set list.

5. The computer-implemented method of claim 4 further comprising:
    determining, by the computer, whether the number of unused pages in the predefined target page set is less than or equal to the predefined minimum unused page threshold level; and
    storing, by the computer, the message in the predefined target page set of a predefined storage class corresponding to the predefined target page set in response to determining that the number of unused pages in the predefined target page set is not less than or equal to the predefined minimum unused page threshold level.

6. The computer-implemented method of claim 5 further comprising:
selecting, by the computer, the spill-over page set from a top of the page set list in response to determining that the number of unused pages in the predefined target page set is less than or equal to the predefined minimum unused page threshold level.

7. The computer-implemented method of claim 6 further comprising:
assigning, by the computer, an extended storage class corresponding to the spill-over page set to a queue in a multi-dwelling queue; and
storing, by the computer, the message in the spill-over page set via the extended storage class in the queue.

8. The computer-implemented method of claim 1, wherein the spill-over page set contains an index of message locations that includes an identifier of the spill-over page set for reading messages when the messages corresponding to a full page set are stored across a plurality of spill-over page sets.

9. The computer-implemented method of claim 1, wherein a queue is automatically updated in response to a predefined storage class and extended storage class of the queue reaching a predefined maximum storage threshold level.

10. A computer system for intelligent storage of messages, the computer system comprising:
a bus system;
a storage device connected to the bus system, wherein the storage device stores program instructions; and
a processor connected to the bus system, wherein the processor executes the program instructions to:
select a spill-over page set in persistent storage to store messages received from buffer pools, wherein the received messages are corresponding to a predefined target page set associated with an application workload in response to the predefined target page set reaching a predefined minimum unused page threshold level;
utilize the spill-over page set as a message storage destination for the received messages corresponding to the predefined target page set associated with the application workload to extend message storage for the predefined target page set after the predefined target page set reached the predefined minimum unused page threshold level;
detect a number of unused pages of the predefined target page set associated with the application workload is greater than the predefined minimum unused page threshold level by a defined percentage amount; and
utilize the predefined target page set as the message storage destination in response to detecting that the number of unused pages of the predefined target page set associated with the application workload is greater than the predefined minimum unused page threshold level by the defined percentage amount.

11. The computer system of claim 10, wherein the processor further executes the program instructions to:
monitor an unused page status of each respective page set in a plurality of page sets; and
detect that the predefined target page set associated with the application workload has reached the predefined minimum unused page threshold level based on the monitoring of the unused page status of each respective page set.

12. The computer system of claim 10, wherein the processor further executes the program instructions to:
determine whether a scale-out bit is set for the predefined target page set.

13. The computer system of claim 10, wherein the processor further executes the program instructions to:
receive a message corresponding to the predefined target page set associated with the application workload of a service; and
identify a number of unused pages in the predefined target page set based on information contained in a page set list.

14. A computer program product for intelligent storage of messages, the computer program product comprising a computer-readable storage medium having program instructions embodied therewith, the program instructions executable by a computer to cause the computer to perform a method of:
selecting, by the computer, a spill-over page set in persistent storage to store messages received from buffer pools, wherein the received messages are corresponding to a predefined target page set associated with an application workload in response to the predefined target page set reaching a predefined minimum unused page threshold level;
utilizing, by the computer, the spill-over page set as a message storage destination for the received messages corresponding to the predefined target page set associated with the application workload to extend message storage for the predefined target page set after the predefined target page set reached the predefined minimum unused page threshold level;
detecting, by the computer, that a number of unused pages of the predefined target page set associated with the application workload is greater than the predefined minimum unused page threshold level by a defined percentage amount; and
utilizing, by the computer, the predefined target page set as the message storage destination in response to detecting that the number of unused pages of the predefined target page set associated with the application workload is greater than the predefined minimum unused page threshold level by the defined percentage amount.

15. The computer program product of claim 14 further comprising:
monitoring, by the computer, an unused page status of each respective page set in a plurality of page sets; and
detecting, by the computer, that the predefined target page set associated with the application workload has reached the predefined minimum unused page threshold level based on the monitoring of the unused page status of each respective page set.

16. The computer program product of claim 14 further comprising:
determining, by the computer, whether a scale-out bit is set for the predefined target page set.

17. The computer program product of claim 14 further comprising:
receiving, by the computer, a message corresponding to the predefined target page set associated with the application workload of a service; and identifying, by the computer, a number of unused pages in the predefined target page set based on information contained in a page set list.

\* \* \* \* \*